United States Patent [19]

Blake et al.

[11] Patent Number: 4,619,187
[45] Date of Patent: Oct. 28, 1986

[54] FLUID CONTROL FOR TWO INDEPENDENT ACTUATORS

[75] Inventors: William W. Blake, Kewanee; Alan R. Coutant, Chillicothe, both of Ill.

[73] Assignee: Caterpillar Inc., Peoria, Ill.

[21] Appl. No.: 638,447

[22] PCT Filed: Oct. 25, 1982

[86] PCT No.: PCT/US82/01540

§ 371 Date: Oct. 25, 1982

§ 102(e) Date: Oct. 25, 1982

[51] Int. Cl.[4] .................................... F15B 11/00
[52] U.S. Cl. ................................. 91/523; 91/529; 137/596.16
[58] Field of Search ............ 91/445, 516, 517, 518, 91/521, 522, 523, 524, 529, 532, 527, 530; 137/596.14, 596.16

[56] References Cited

U.S. PATENT DOCUMENTS

| 2,952,246 | 9/1960 | Collins ........................ 137/596.16 |
| 3,002,498 | 10/1961 | Quayle ........................... 91/521 |
| 3,473,418 | 10/1969 | Ullery ............................ 74/868 |
| 3,505,906 | 4/1970 | Lemieux ......................... 74/753 |
| 3,540,220 | 11/1970 | Lauck ............................ 91/521 |
| 3,656,496 | 4/1972 | Uenoyama et al. ............ 137/116.3 |
| 3,847,059 | 11/1974 | Beck ............................. 91/532 |
| 3,908,515 | 9/1975 | Johnson ......................... 91/445 |
| 3,987,920 | 10/1976 | Parquet ......................... 91/529 |
| 4,296,773 | 10/1981 | Harshman ...................... 91/522 |
| 4,341,149 | 7/1982 | Dezelan ........................ 91/445 |
| 4,473,095 | 9/1984 | Motzer ...................... 137/596.16 |
| 4,492,251 | 1/1985 | Blake ....................... 137/596.16 |

FOREIGN PATENT DOCUMENTS 2356414 5/1975 Fed. Rep. of Germany ........ 91/532

*Primary Examiner*—Abraham Hershkovitz
*Attorney, Agent, or Firm*—J. W. Burrows

[57] ABSTRACT

A fluid control system (10) for selectively controlling two independent actuators or clutches (12, 14) has a pair of normally opened solenoid valves (62, 64) for controlling fluid pressure in a pair of actuating chambers (40, 42). This controls actuation of a pair of directional spools (36, 38) which in turn controls engagement and disengagement of the clutches (12, 14) such that failure of one of the solenoid valves to close properly would not allow engagement of the clutches. A common actuating chamber (44) is provided between the directional spools (36, 38) and in fluid communication with the first and second actuating chambers (40, 42) through orifices (58). The abutment of the first and second directional spools prevents simultaneous engagement of both clutches.

6 Claims, 1 Drawing Figure

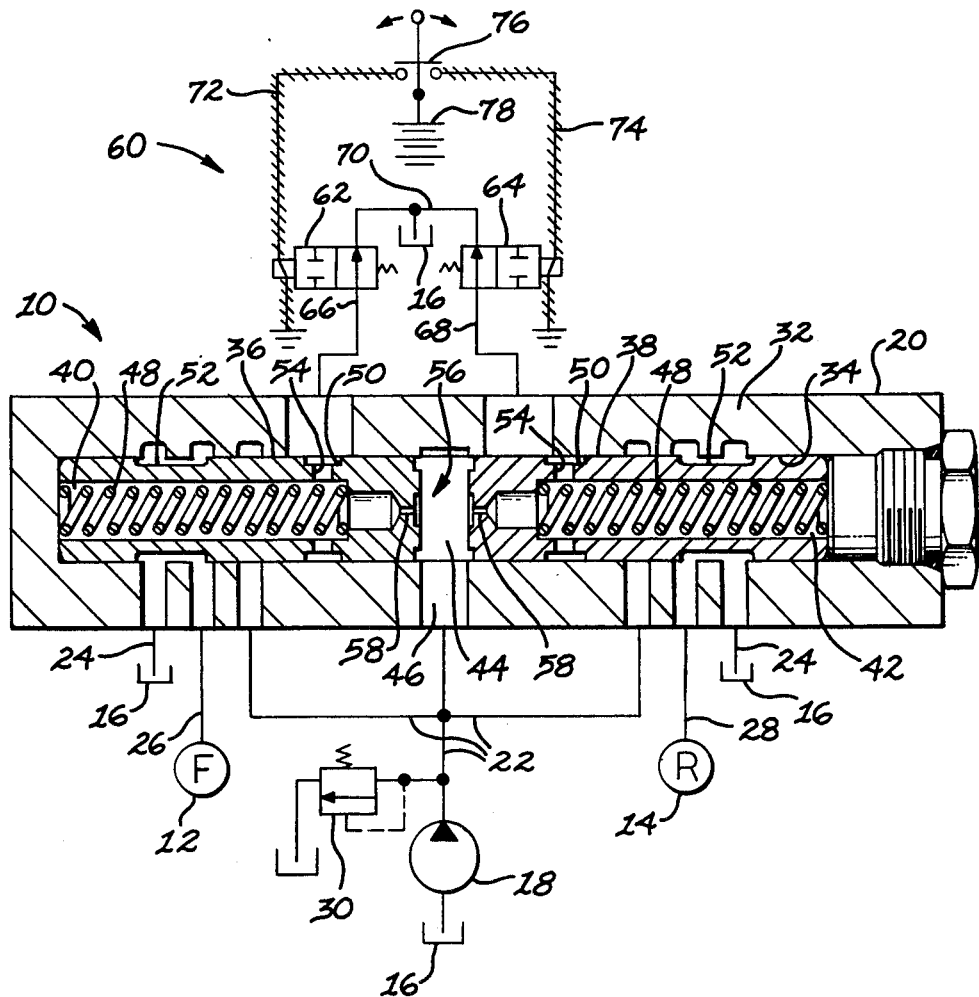

FLUID CONTROL FOR TWO INDEPENDENT ACTUATORS

TECHNICAL FIELD

This invention relates generally to a fluid control system for selectively controlling the actuation of two independent actuators and more particularly to such a system which prevents operation of the actuators if the controls are affected by contaminates.

BACKGROUND ART

One control arrangement for a single speed transmission having independently actuatable forward and reverse clutches has a control valve with a pair of directional spools for selectively actuating the clutches. Each of the directional spools are moved to a position for actuating the associated clutch by venting pressurized fluid from a chamber at one end of the associated spool through a solenoid valve. The solenoid valve is normally spring biased to the closed position to cause the chamber to become pressurized and is moved to the open or venting position upon energizing the coil thereof.

One of the problems encountered with such control arrangement is that if one of the clutches is partially engaged due to a leaky solenoid valve caused by contaminates, the partial engagement would cause slippage and serious damage to the clutch.

The present invention is directed to overcoming one or more of the problems as set forth above.

DISCLOSURE OF THE INVENTION

In one aspect of the present invention. A fluid control system for selectively controlling actuation of a pair of actuators comprises a reservoir; a pump connected to the reservoir; a control valve having a bore, a pair of directional spools slidably positioned in the bore, a common actuating chamber defined in the bore between one end of each of the directional spools, and first and second actuating chambers each being defined in the bore at the other end of each of the directional spools, said common actuating chamber being in fluid communication with said pump, each of the directional spools being movable between a first position at which the pump is in communication with one of the actuators and a second position at which said one of the actuators is in communication with the reservoir, the directional spools being arranged in the bore so that only one of the directional spools is moved to its first position when one of the first and second actuating chambers is pressurized; orifice means for communicating said pump with said first and second actuating chambers; and control means for selectively pressurizing said first and second actuating chambers.

The problem caused by a leaky solenoid valve is solved by the use of a pair of normally open solenoid valves controlling a pair of directional spools having a common actuating chamber defined in the bore between the directional spools and by having the directional spools adapted to abut one another so that only one of the clutches can be engaged when one solenoid valve is actuated or to prevent operation of the clutches if the normally open solenoid valves are affected by contaminates.

BRIEF DESCRIPTION OF THE DRAWINGS

The sole FIGURE is a schematic of the embodiment of the present invention with portions shown in cross section.

BEST MODE FOR CARRYING OUT THE INVENTION

Referring now to the drawing, a fluid control system is generally indicated by the reference numeral 10 and selectively controls actuation of two independent actuators 12,14. The actuators in the embodiment shown are forward and reverse clutches, respectively, of the type which are engaged by fluid pressure directed thereto and disengaged when the pressurized fluid is vented therefrom. The pump control system 10 includes a reservoir 16, a pump 18 connected to the reservoir, and a control valve 20 connected to the output of the pump 18 through a branched pressure conduit 22 and to the reservoir 16 through a drain conduit 24. A pair of motor conduits 26,28 connect the control valve 20 with the forward and reverse clutches 12,14, respectively. A relief valve 30 is connected to the pressure conduit 22 to control the fluid pressure level in a conventional manner.

The control valve 20 includes a valve body 32 having a bore 34 therein. A pair of directional spools 36,38 are slidably positioned within the bore 34. A common actuating chamber 44 is defined in the bore between one end of each of the directional spools 36,38. First and second actuating chambers 40,42 are defined in the bore at the other end of each of the directional spools 36,38. A port 46 in the valve body 32 connects the common actuating chamber 44 with the pump 18 through the conduit 22. Each of the first and second actuating chambers 40,42 has a spring 48 positioned therein for urging the associated directional spool 36 or 38 in a direction towards the common actuating chamber 44. The directional spools 36,38 have first and second annular grooves 50,52 formed therein. A passage 54 connects the first annular groove 50 with the actuating chambers 40,42.

The fluid control system 10 also includes an orifice means 56 for communicating the pump 18 with the first and second actuating chambers 40,42. The orifice means 56 includes an orifice 58 defined in each of the directional spools 36,38 and being adapted to communicate the first and second actuating chambers 40,42 with the common actuating chamber 44.

The fluid control system 10 further includes a control means 60 for selectively pressurizing the first and second actuating chambers 40,42. The control means 60 includes a pair of normally open two position solenoid actuated valves 62,64 connected to the first and second actuating chambers 40,42, respectively, through conduits 66,68, annular grooves 50, and passages 54, and to the reservoir 16 through a conduit 70. A pair of electrical lines 72,74 connect the solenoid valves 62,64 to the output terminals of a switch 76 which in turn has its input terminal connected to a storage battery 78. Preferably, the orifices 58 are smaller than the passages in the normally opened solenoid valve 62,64.

INDUSTRIAL APPLICABILITY

In the operation of the fluid control system 10, each of the directional spools 36,38 is movable between a first position at which the pressure conduit 22 is in communication with the actuator 12 or 14 through the annular groove 52 and a second position at which the actuator 12 or 14 is communication with the reservoir conduit 24 through the annular groove 52. At the first position of each directional spool 36,38, the actuator 12 or 14 is blocked from communication with the reservoir conduit 24 and in communication with the pressure conduit 22. At the second position of each of the directional spools 36,38, the actuator 12 or 14 is blocked from communication with the pressure conduit 22 and in fluid communication with the reservoir conduit 24. Each of the normally opened solenoid valves 62,64 is movable between a first position at which the respective actuating chamber 40 or 42 is in communication with the reservoir 16 and a second position at which communication between the respective actuating chamber 40 or 42 and the reservoir 16 is blocked. The normally opened solenoid valves 62,64 are biased to their open position by springs in a conventional manner.

The solenoid valves 62,64 and directional spools 36,38 are shown in the positions they would occupy when the system is operational with the actuators or clutches disengaged. The pump 18 supplies fluid through the pressure conduit 22 at a level established by the relief valve 30 and is in continuous unrestricted communication with the common actuating chamber 44 and in restricted communication with the first and second actuating chambers 40,42 through the orifices 58. With the solenoid valves 62,64 in the normally opened position shown, a pressure drop occurs across the orifice 58 so that the fluid pressure in the actuating chambers 40,42 is less than the fluid pressure in the common actuating chamber 44. Consequently, the directional spools 36,38 are moved outwardly against the bias of the springs 48 to their second position at which the actuators 12,14 are disengaged.

Engagement of the actuator 12, for example, is initiated by moving the switch 76 to the left energizing solenoid valve 62 causing it to move to the second position blocking the fluid flow through conduit 66. This causes the pressure in actuating chamber 40 to increase to a level equal to that in the common actuating chamber 44. With the fluid pressure in chamber 44 and 40 being equal, the spring 48 then moves the directional spool 36 to the first position at which communication between the pressure conduit 22 and the actuator 12 is established. With the directional spool 36 in the first position, the end of the directional spool 36 opposite the first actuating chamber 40 is in abutment with the other directional spool 38 maintaining the other directional spool 38 in its second position. Thus, with the directional spools 36,38 in abutment one with the other, only one of the actuators 12,14 can be in fluid communication with the pressure conduit 22 while the other actuator 12,14 must be in fluid communication with the reservoir 16.

To disengage the actuator 12, the switch 76 is moved back to the neutral position shown de-energizing the solenoid valve 62 so that it moves to the normally opened position, again communicating the actuating chamber 40 with the reservoir 16. As previously described, the pressure drop across orifice 58 decreases the pressure in the actuating chamber 40 so that the fluid pressure in the common actuating chamber 44 moves the directional spool 36 to the second position blocking communication between the pressure conduit 22 and the actuator 12 while connecting the actuator 12 with the drain conduit 24.

Engagement and subsequent disengagement of the second actuator 14 is accomplished in a similar manner by moving the switch 76 to the right to control movement of the directional spool 38 between its first and second positions.

If for example, both of the solenoid valve 62,64 are in their closed position, the pressure in the first and second actuating chambers 40,42 would increase causing both of the directional spools 36,38 to move towards their first positions. As the pressure in the first and second actuating chambers 40,42 approaches the same pressure that exists in the common actuating chamber 44, the springs 48 will cause the directional spools 36,38 to abut one another causing both of the directional spools 36,38 to be maintained in their second positions which provides communication between the first and second actuators 12,14 and the reservoir conduit 16.

In view of the foregoing, it is readily apparent that the structure of the present invention provides an improved fluid control system for controlling the actuation of two independent actuators. The common actuating chamber provides fluid pressure to the first and second actuating chambers through the orifices thus providing a positive force to maintain the directional spools in their second position for venting the first and second actuators. If the normally open solenoid valves are inadvertently in their closed positions, the directional spools will move into abutment one with the other due to the equal pressure in the actuating chamber and the springs will center the spools thus maintaining the spools in their second position in which both the first and second actuators are in communication with the reservoir.

Other aspects, objects and advantages of the invention can be obtained from a study of the drawings, the disclosure and the appended claims.

We claim:

1. A fluid control system (10) for selectively controlling actuation of a pair of actuators (12,14) comprising:
   a reservoir (16);
   a pump (18) connected to the reservoir (16);
   a control valve (20) having a bore (34), a pair of directional spools (36,38) slidably positioned in the bore (34), a common actuating chamber (44) defined in the bore (34) between one end of each of the directional spools (36,38), and first and second actuating chambers (40,42) each being defined in the bore (34) at the other end of each of the directional spools (36,38), said common actuating chamber (44) being in fluid communication with said pump (18), each of the directional spools (36,38) being movable between a first position at which the pump (18) is in communication with one of the actuators (12,14) and a second position at which said one of the actuators is in communication with the reservoir (16), said directional spools (36,38) being arranged in the bore (34) so that only one of the directional spools (36,38) is moved to its first position when one of the first and second actuating chambers (40,42) is pressurized;
   orifice means (56) for communicating said pump (18) with said first and second actuating chambers (40,42); and
   control means (60) for selectively pressurizing said first and second actuating chambers (40,42).

2. The fluid control system (10), as set forth in claim 1, wherein said orifice means (56) includes an orifice (58) located in each of the directional spools (36,38), said orifices (58) being adapted to communicate the common actuating chamber (44) with the first and second actuating chambers (40,42).

3. The fluid control system (10), as set forth in claim 2, wherein said control means (60) includes first and second normally open solenoid valves (62,64) connected to the first and second actuating chambers (40,42) and to the reservoir (16).

4. The fluid control system (10), as set forth in claim 1 including a pair of springs (48) positioned respectively within the first and second actuating chambers (40,42) biasing the directional spools (36,38) towards their first positions.

5. The fluid control system (10), as set forth in claim 1 wherein the ends of each of the directional spools (36,38) are in abutment when one of the directional spools (36,38) is at the first position so that the other directional spool (36,38) is maintained in the second position.

6. The fluid control system (10), as set forth in claim 1, wherein the directional spools (36,38) are in the second position when the fluid pressures in the first and second actuating chambers (40,42) are equal.

* * * * *